US006796096B1

(12) United States Patent
Heath

(10) Patent No.: US 6,796,096 B1
(45) Date of Patent: Sep. 28, 2004

(54) IMPACT ABSORBING SURFACE COVERING AND METHOD FOR INSTALLING THE SAME

(75) Inventor: Robert G. Heath, Armonk, NY (US)

(73) Assignee: Koala Corporation, Englewood, CO (US)

(*) Notice: Subject to any disclaimer, the term of this patent is extended or adjusted under 35 U.S.C. 154(b) by 72 days.

(21) Appl. No.: 10/218,301

(22) Filed: Aug. 13, 2002

Related U.S. Application Data

(60) Provisional application No. 60/311,915, filed on Aug. 13, 2001.

(51) Int. Cl.[7] ............................................... E04F 15/22
(52) U.S. Cl. ..................... 52/403.1; 52/177; 52/169.1; 428/15; 428/17; 428/87; 428/85; 428/95; 472/92; 473/157
(58) Field of Search ............................. 52/169.1, 169.2, 52/169.3, 169.4, 403.1, 177, 180, 292; 428/15, 17, 87, 85, 95; 472/92; 473/171, 157–164

(56) References Cited

U.S. PATENT DOCUMENTS

| | | | | |
|---|---|---|---|---|
| 3,661,687 A | * | 5/1972 | Spinney et al. ............... | 428/17 |
| 3,735,988 A | * | 5/1973 | Palmer et al. ............... | 473/162 |
| 3,801,421 A | * | 4/1974 | Allen et al. .................... | 428/17 |
| 4,023,506 A | * | 5/1977 | Robey ..................... | 47/58.1 R |
| 4,044,179 A | * | 8/1977 | Haas, Jr. ...................... | 428/17 |
| 4,268,551 A | * | 5/1981 | Moore, Jr. .................... | 428/17 |
| 4,356,220 A | * | 10/1982 | Benedyk ..................... | 428/17 |
| 4,399,954 A | * | 8/1983 | Arrant ........................ | 242/393 |
| 4,617,208 A | * | 10/1986 | Cadenhead, Sr. ............. | 428/17 |
| 4,617,218 A | * | 10/1986 | Cadenhead, Sr. ............. | 428/92 |
| 4,637,942 A | * | 1/1987 | Tomarin ...................... | 428/17 |
| 4,738,407 A | * | 4/1988 | Arrant ..................... | 242/390.2 |
| 4,755,401 A | * | 7/1988 | Friedrich et al. ............. | 428/17 |
| 4,946,719 A | * | 8/1990 | Dempsey ..................... | 428/17 |
| 4,948,116 A | * | 8/1990 | Vaux ........................... | 472/92 |
| 4,991,834 A | * | 2/1991 | Vaux ........................... | 472/92 |
| 5,254,039 A | * | 10/1993 | Garcia ......................... | 472/92 |
| 5,309,846 A | * | 5/1994 | Peterson ................... | 108/53.3 |
| 6,090,462 A | | 7/2000 | Kanter ...................... | 428/40.1 |
| 6,221,445 B1 | * | 4/2001 | Jones ......................... | 428/17 |
| 6,616,542 B1 | * | 9/2003 | Reddick ..................... | 473/171 |

FOREIGN PATENT DOCUMENTS

| | | | | |
|---|---|---|---|---|
| CA | 2309839 | | 5/1999 | .......... A47G/27/00 |
| WO | WO 99/25231 | | 5/1999 | .......... A47G/27/00 |

OTHER PUBLICATIONS

Jun. 23, 2003 print–out of SafeLandings™ website at http://www.safelandings.com.
Jun. 23, 2003 print–out of SafeLandings™ website at http://www.safelandings.com/cam36.htm.
SafeLanding® Shock Absorbing Carpet System Safety Surfacing, Aug. 2001.
Mar. 5, 2003 print–out of Surface America, Inc.'s website at http://www.surfaceamerica.com.

* cited by examiner

Primary Examiner—Jeanette E. Chapman
(74) Attorney, Agent, or Firm—Sheridan Ross P.C.

(57) ABSTRACT

An impact absorbing surface covering adapted for use with a high impact traffic area is provided. A shock pad of post industrial, recycled closed cell foam is used in conjunction with an impervious wear surface, such as rubber, sprayed polyurethane, or artificial turf, in order to provide a durable, impact absorbent area, which can be easily adapted to varying shapes and sizes in a seamless manner to create an economical and resilient alternative for indoor/outdoor, commercial or recreational use. A method for installing an impact absorbing surface covering is also provided in which shock pads comprised of foam, fabric, and mesh layers are positioned on the ground, cement, or a floor, and are covered by a substantially impervious wear surface, thereby creating a non-purous, impact-absorbent, product with an extended life span.

4 Claims, 3 Drawing Sheets

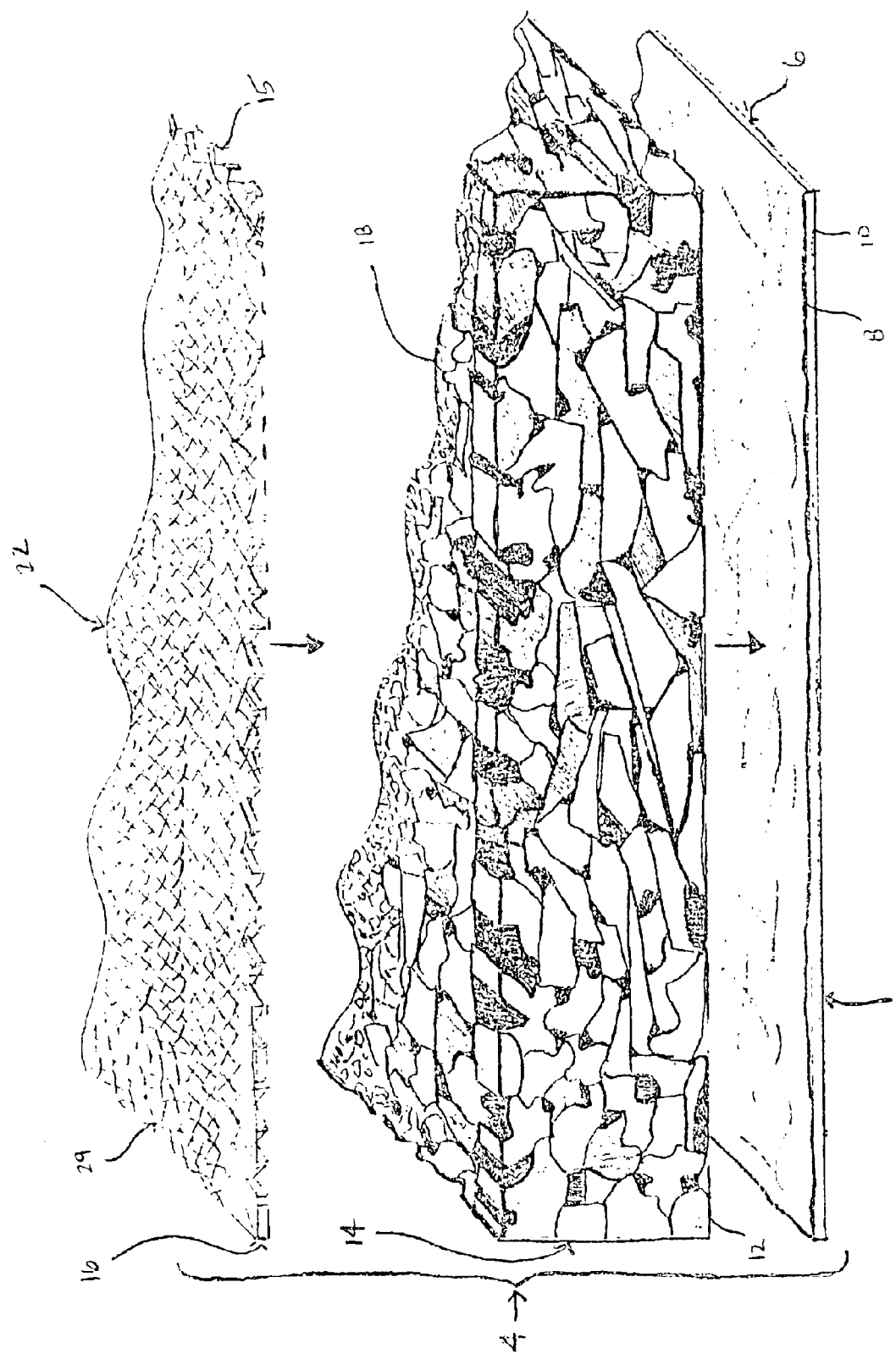

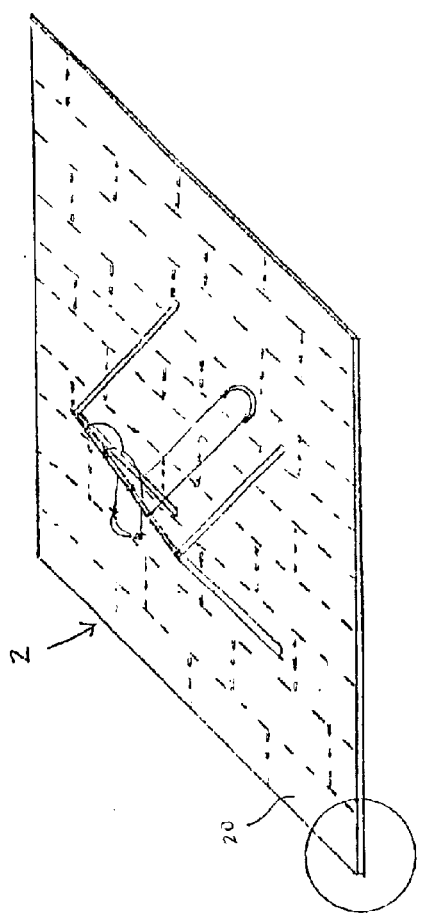
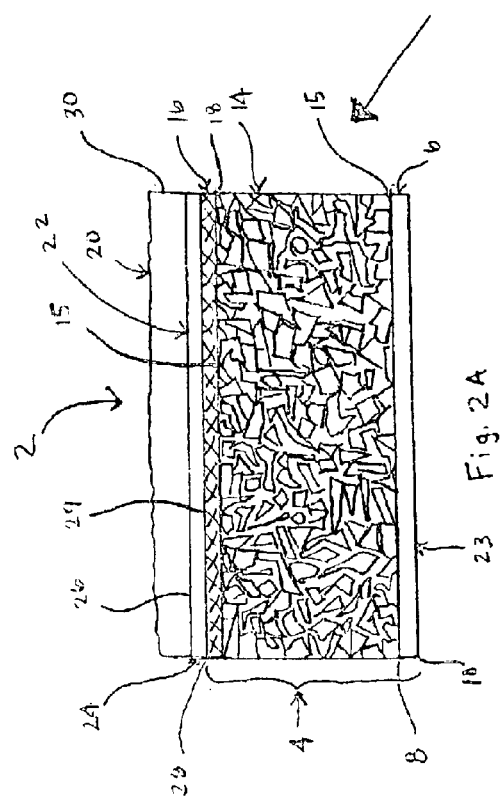

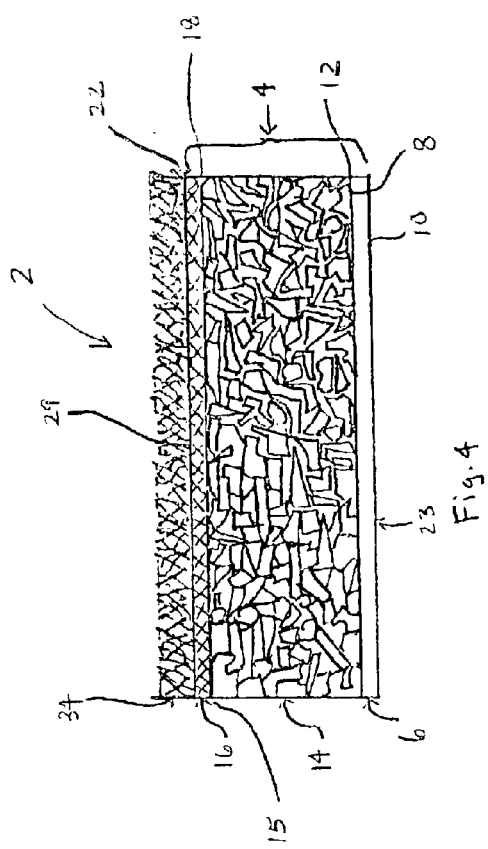
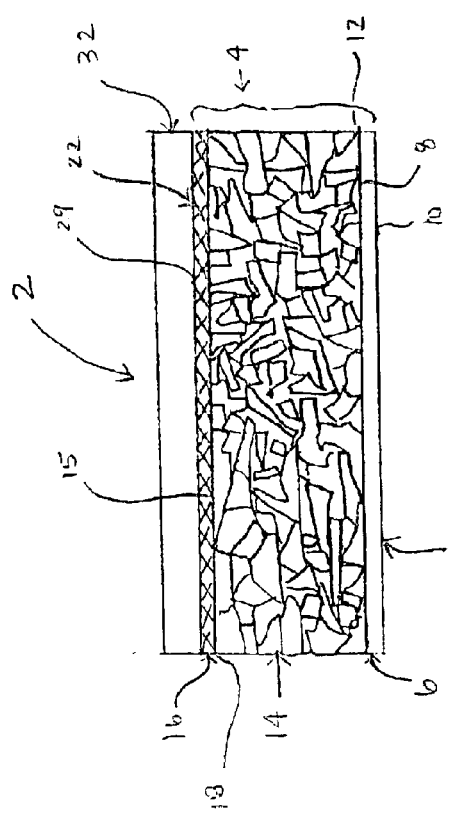

IMPACT ABSORBING SURFACE COVERING AND METHOD FOR INSTALLING THE SAME

Priority is claimed from U.S. Provisional Application, Serial No. 60/311,915, entitled "IMPACT ABSORBING SURFACE COVERING AND METHOD FOR INSTALLING SAME," filed Aug. 13, 2001, the entire disclosure of which is herein incorporated by reference.

FIELD OF THE INVENTION

The present invention relates to a surface covering and more particularly to an impact absorbing floor covering for indoor or outdoor surface use on playgrounds, gym floors, and other high impact surfaces and a method of installing the same.

BACKGROUND OF THE INVENTION

Playground and gym equipment is found across the globe in both indoor and outdoor applications. Playground equipment is commonly found in urban parks and recreational areas, and is increasingly being installed at rest stops, restaurant establishments, and schools. Similarly, indoor recreational gyms are thriving in most urban areas. In an attempt to reduce serious injuries to children or other recreational users, a shock absorbing material is typically installed over the underlying recreational area, e.g., concrete. The shock absorbing material assists in softening the blow of contact with the concrete for a user, thereby reducing the likelihood of serious injury.

Economical surface coverings vary in form, but generally fall into three groups: (1) tiles made out of an absorbent material, such as rubber, which are pieced together and adhered to the underlying concrete; (2) products that are poured over the recreational area surface, which can be applied in varying layers; and (3) engineered wood fiber.

It is known in the industry to apply recycled rubber or foam tiles to a concrete playground or indoor gym area. These tiles are typically laid out in a specific pattern and then adhered to the concrete, thereby creating numerous seams which are subject to thermal expansion and contraction. As a result, users may be exposed to an increased risk of injury from tripping or stumbling due to one of these crevices. Moreover, the lack of a seamless surface allows moisture, dirt, and insects to penetrate the surface, thereby compromising the integrity of the absorbent nature of the tile. As a result, the tiles may have a reduced life expectancy due to rot, decay, and bacterial growth.

One example of an attempt to resolve the aforementioned problems is disclosed in U.S. Pat. No. 6,090,462 ("the '462 Patent") to Kanter, where a carpet assembly is disclosed which comprises a mat of closed cell foam, a layer of pressure sensitive adhesive, and a layer of carpet. The '462 Patent, including disclosure of all embodiments contained therein, is herein incorporated by reference in its entirety. While the '462 Patent addresses the problem of eliminating the wicking of adhesive material into the closed cell foam, it does not solve the issue of the present invention, which is to prevent moisture and other foreign matter from penetrating the wear surface, e.g., carpet.

While poured-in-place products do not have seams, they suffer from similar problems as tiles. Typically, a first layer of shredded rubber mixed with glue is poured over the concrete surface and troweled to a smooth level. Next, a second layer of a finer grade rubber/glue mixture is poured over the first layer, is also troweled, and then, allowed to cure. As can be appreciated, this composite of rubber and glue is extremely porous and susceptible to wear (e.g. the path underneath a child's swing is especially prone to wear). The porous nature of this product also poses a risk for tripping and makes this product prone to having its integrity compromised, thereby limiting its life expectancy.

Thus, there is a significant need for an impact absorbing surface covering that is economical to produce, seamless, and non-porous, thereby creating a long life expectancy.

SUMMARY OF THE INVENTION

The present invention is designed to overcome the aforementioned problems. It is thus one aspect of the present invention to provide an economical, impervious, impact absorbing surface covering having a shock pad and a wear surface adapted for use with playgrounds and other recreational areas. Thus, in one embodiment, a sprayed polyurethane wear surface is provided which protects the impact absorbent nature of the shock pad from the elements and other foreign matter, thereby decreasing the need for frequent replacement. Impervious means being substantially incapable of being penetrated.

It is another aspect of this invention to provide a substantially seamless, impact absorbing surface covering in order to minimize the risk of injury to the user. Thus, in this embodiment, sprayed polyurethane, as described above, is provided which conforms to the underlying shock pad, resulting in a seamless surface. In another embodiment, a rubber wear surface is provided which can be caulked in order to provide a relatively seamless surface. In yet another embodiment, a turf wear surface is provided which can be slightly overlapped, thereby also resulting in a relatively seamless surface.

It is a further aspect of this invention to provide the user with a choice of wear surfaces while maintaining the non-porous and impervious nature of the wear surface. As noted above, various embodiments of wear surfaces, including, but not limited to, sprayed polyurethane, rubber, or artificial turf, are provided in order to allow the user to adapt the wear surface to his particular needs. Of course, other embodiments involving impervious, relatively seamless, wear surfaces are also intended to be within the scope of this invention.

It is yet a further aspect of the invention to use post-industrial, recycled material for the underlying shock pad. In one embodiment, closed cell polyethylene foam is provided. Other resilient materials, such as rubber and styrofoam, are also within the scope of this invention.

In one embodiment of the present invention, an impact absorbing surface adapted for use with a high impact area is provided, comprising:

(a) a shock pad having a top side and a bottom side and comprised of a closed cell foam layer;

(b) a first geotextile fabric layer fastened to said bottom side of said shock pad;

(c) a mesh layer having a top side and a bottom side, wherein the bottom side of said mesh layer is fastened to said top side of said shock pad;

(d) a second geotextile fabric layer fastened to said top side of said mesh layer; and (e) a substantially impervious wear surface interconnected to said second geotextile fabric layer.

The present invention offers an alternative to traditional shock-absorbing materials used in urban parks and indoor recreational areas. Now, an economical, seamless, impact absorbent surface can be installed for use in indoor or outdoor venues.

BRIEF DESCRIPTION OF THE DRAWINGS

FIG. 1 is an isometric perspective view of one embodiment of the impact absorbent shock pad adapted for use with the present invention;

FIG. 2 is an isometric perspective view of one embodiment of the impact absorbent surface covering shown in application below a typical outdoor playground area;

FIG. 2A is a cross-sectional, front elevation view of the embodiment of the impact absorbent surface covering shown in FIG. 2;

FIG. 3 is a cross-sectional front elevation view of a second embodiment of the impact absorbent surface covering; and FIG. 4 is a cross-sectional front elevation view of a third embodiment of the impact absorbent surface covering.

DETAILED DESCRIPTION

Traditional means for covering indoor and outdoor high impact areas vary from loose products to patchworks of synthetic tiles to poured products. However, none of these materials offer an alternative which is economical, non-porous, resilient to foot traffic, and substantially seamless. The current invention provides an effective solution to these problems. Accordingly, the present invention is generally comprised of a shock pad and a wear surface, which can be varied depending on the use of the impact absorbent surface covering. The shock pad, which is primarily comprised of post-industrial recycled materials, can be laid in strips across the desired area and then, a substantially impervious wear surface can be applied thereto. This design minimizes the use of seams and allows for the user to customize the wear surface while maintaining the absorbent nature of the underlying shock pad.

Referring now to the drawings, FIG. 1 is an isometric perspective view of one embodiment of the impact absorbent shock pad 4 adapted for use with an impact absorbent surface covering 2 (not shown). The shock pad 4 is generally comprised of a geotextile fabric layer 6, having a top surface 8 and a bottom surface 10, which is adhered to a bottom surface 12 of a strip of closed cell foam layer 14. A mesh layer 16 is generally adhered to a top surface 18 of the closed cell foam layer 14. The top surface 8 of the geotextile fabric layer 6 is adhered to the bottom surface 12 of the closed cell foam layer 14 in order to provide a surface to attach the shock pad 4 to the desired area (i.e., the bottom surface 12 of the closed cell foam layer 14 is quite porous). Although preferably made out of geotextile fabric, the layer 6 can also be made of other durable, lightweight materials, which provide surfaces that readily adhere to a variety of structures.

The closed cell foam layer 14 is preferably comprised of post-industrial, recycled, cross-link, closed cell polyethylene foam, but can be made out of alternative resilient materials, such as non-recycled rubber or styrofoam. Due to its recycled nature, the closed cell foam layer 14 is environmentally friendly and has a functional life expectancy of more than 20 years. The closed cell foam layer 14 primarily absorbs the impact from the user. In one embodiment, the closed cell foam layer 14 has the following general characteristics: (1) impervious to most chemicals and decay; (2) high impact retention values; (3) tolerates extreme loading with quick compression recovery; (4) absorbs both shock and vibration; (5) structurally strong yet flexible even at sub-zero temperatures; (6) mold resistant; (7) has a density of 4 lbs to 6 lbs per cubic foot; (8) has a tensile strength of approximately 12 k/Nm; and (9) can sustain 16 N of force in a static puncture test. The closed cell foam layer 14 is preferably made in approximately 1½ inch planks, which can be heat welded and skived as necessary to accommodate the needs of a particular area. The closed cell foam layer 14 can also be made in varying thicknesses depending upon the needs of the particular application. For greater impact recreational areas, thicker pads can be used and vice versa.

Also shown in FIG. 1, a bottom surface 15 of a mesh layer 16 is generally adhered to a top surface 18 of the closed cell foam layer 14. The mesh layer 16 is used to attenuate the impact sustained by the shock pad 4. The mesh layer 16, in a preferred embodiment, is comprised of plastic, but it is understood that other compositions may be used. It is also preferable that the mesh layer 16 be manufactured in a lattice-like, geometric configuration in order to provide an additional layer to attenuate the impact, while minimizing the cost of production for said layer 16. This configuration provides a sufficient gripping surface for the wear surface to be interconnected thereto, preferably by glue or other well known adhesives. Of course, the mesh layer 16 could also comprise other shapes, such as hexagonal or square.

FIG. 2 depicts a typical outdoor playground area overlaid with one embodiment of the impact absorbent surface covering 2. This configuration allows a user to lay planks of the shock pad 4 (as shown in FIG. 2) across the desired area (e.g., cement, bare ground, asphalt, etc.) and then apply a wear surface 20 across a top surface 22 of said shock pad 4. If the wear surface 20 is sprayed onto the shock pad 4 surface, then there will be no seams, thereby making it, along with the underlying shock pad 4, impervious to moisture, sand, and other unwanted foreign matter. This results in an extended life for the shock pad 4 and completely eliminates the risk of tripping on seams. If the wear surface 20 is applied in rolls, then the user can caulk any seams and achieve the same results.

FIG. 2A is a cross-sectional, front elevation view of the impact absorbent surface covering 2 shown in FIG. 2. In this embodiment, a second geotextile fabric layer 24, having a top surface 26 and a bottom surface 28, is adhered to a top surface 29 of the mesh layer 16 and a polyurethane wear surface 30 has been sprayed over the top surface 26 of the second geotextile fabric layer 24. The resulting polyurethane wear surface 30 is an extremely durable, seamless, non-slip, non-porous, impervious surface. Accordingly, this embodiment is particularly useful in odd shaped recreational areas because the underlying shock pad 4 can be easily cut and the polyurethane wear surface 30 automatically conforms to the underlying top of the shock pad 4.

FIGS. 3 and 4 reflect two different additional wear surfaces 20 that can be easily applied to the shock pad 4 depending on the needs of the recreational area owner. FIG. 3 demonstrates the use of a non-porous, rubber wear surface 32 adhered to the shock pad 4. Although the rubber wear surface 32 is generally applied in rolls over the top surface 22 of the shock pad 4, any resulting seams can be caulked to create an impervious barrier to the elements and unwanted foreign matter. FIG. 4 shows an artificial turf wear surface 34 adhered to the top surface 22 of the shock pad 4. Like the rubber wear surface 32, the turf wear surface 34 is constructed in a non-porous manner and is typically applied in rolls over the top surface 22 of the shock pad 4. In order to eliminate seams between the rolled turf wear surface 34, the rolls are slightly overlapped and interconnected, creating a waterproof surface.

By having the flexibility to vary the particular wear surface 20 while maintaining the inherent impact absorbent nature of the shock pad 4, a user can tailor the impact absorbing surface covering 2 to his individual needs. For example, a rubber wear surface 32 can be used in such applications as a rock climbing gym, running track, or aerobic classroom. The polyurethane wear surface 30 could be used in those contexts in which it is essential to provide a non-slip surface, such as outdoor recreational areas. Finally, an artificial turf wear surface 34 also provides an excellent alternative surface for an outdoor playground in which children are prone to fall from playground equipment.

In sum, the impact absorbing surface covering 2 described herein can be used in any commercial or recreational application, which requires a durable and economical impact absorbent surface area.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all aspects as illustrative and not restrictive, and the invention is not intended to be limited to the details given herein.

The following components and numbers associated thereto are provided for clarity purposes:

| #  | Component |
|----|-----------|
| 2  | Impact absorbing surface covering |
| 4  | Shock pad |
| 6  | Geotextile fabric layer |
| 8  | Top surface of geotextile fabric layer |
| 10 | Bottom surface of geotextile fabric layer |
| 12 | Bottom surface of closed cell foam layer |
| 14 | Closed cell foam layer |
| 15 | Bottom surface of mesh layer |
| 16 | Mesh layer |
| 18 | Top surface of closed cell foam layer |
| 20 | Wear surface |
| 22 | Top surface of shock pad |
| 23 | Bottom surface of shock pad |
| 24 | Second geotextile fabric layer |
| 26 | Top surface of second geotextile fabric layer |
| 28 | Bottom surface of second geotextile fabric layer |
| 29 | Top surface of mesh layer |
| 30 | Polyurethane wear surface |
| 32 | Rubber wear surface |
| 34 | Artificial turf wear surface |

What is claimed is:

1. An impact absorbing surface covering adapted for use with a high impact area, comprising:
    (a) a fabric layer having a top surface and a bottom surface;
    (b) a shock pad having a top surface and a bottom surface, said bottom surface of said shock pad operably interconnected to said top surface of said fabric layer;
    (c) a substantially impervious wear surface operably interconnected to said top surface of said shock pad;
    (d) a mesh layer interconnected to said top surface of said shock pad; and
    (e) a second fabric layer interposed between said substantially impervious wear surface and said mesh layer.

2. The surface covering of claim 1, wherein said substantially impervious wear surface is made of a polyurethane material.

3. An impact absorbing surface covering adapted for use with a high impact area, comprising:
    (a) a closed cell foam shock pad having a top side;
    (b) a mesh layer having a top side and a bottom side, wherein the bottom side of said mesh layer is operably interconnected to said top side of said closed cell foam shock pad;
    (c) a substantially impervious wear surface operably positioned on said lop side of said mesh layer; and
    wherein said substantially impervious wear surface is made of polyurethane material which is applied as a fluid.

4. An impact absorbing surface covering adapted for use with a high impact area, comprising:
    (a) a closed cell foam shock pad having a top side and a bottom side;
    (b) a geotextile fabric layer interconnected to said bottom side of said closed cell foam shock pad;
    (c) a mesh layer having a top side and a bottom side, wherein the bottom side of said mesh layer is operably interconnected to said top side of said closed cell foam shock pad;
    (d) a substantially impervious wear surface operably positioned on said top side of said mesh layer; and
    (e) a second geotextile layer interposed between said top side of said mesh layer and said substantially impervious wear surface.

* * * * *